UNITED STATES PATENT OFFICE.

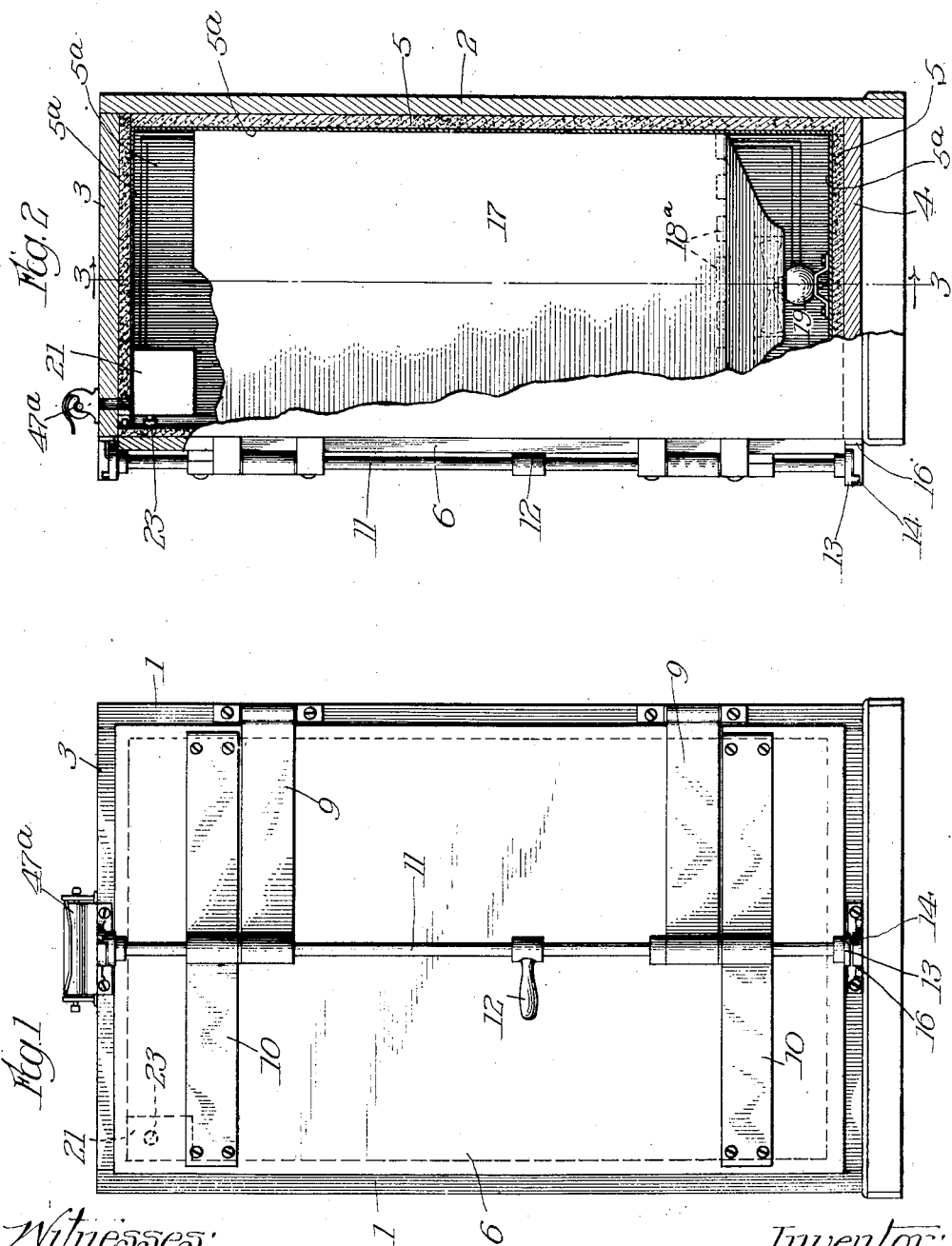

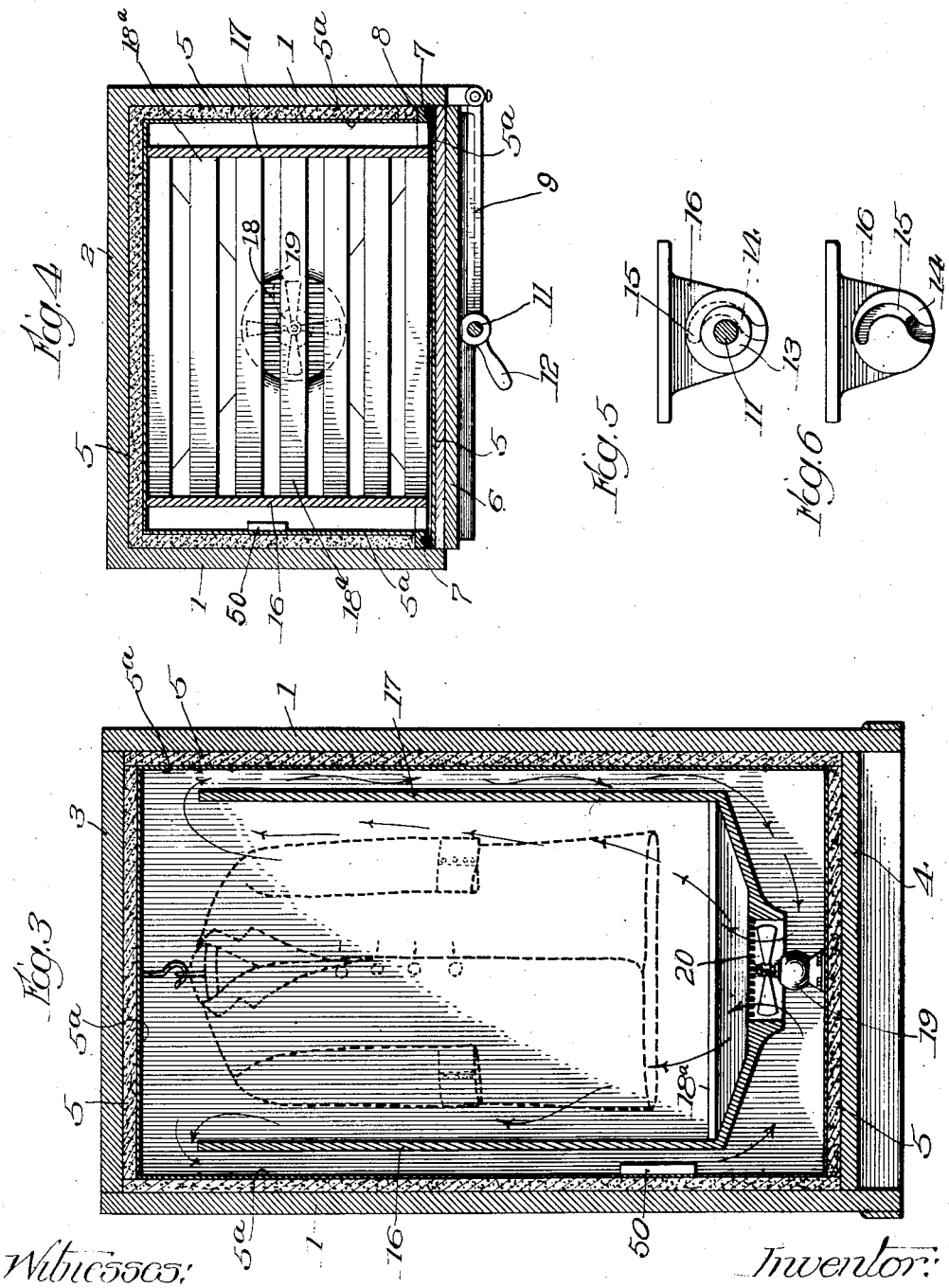

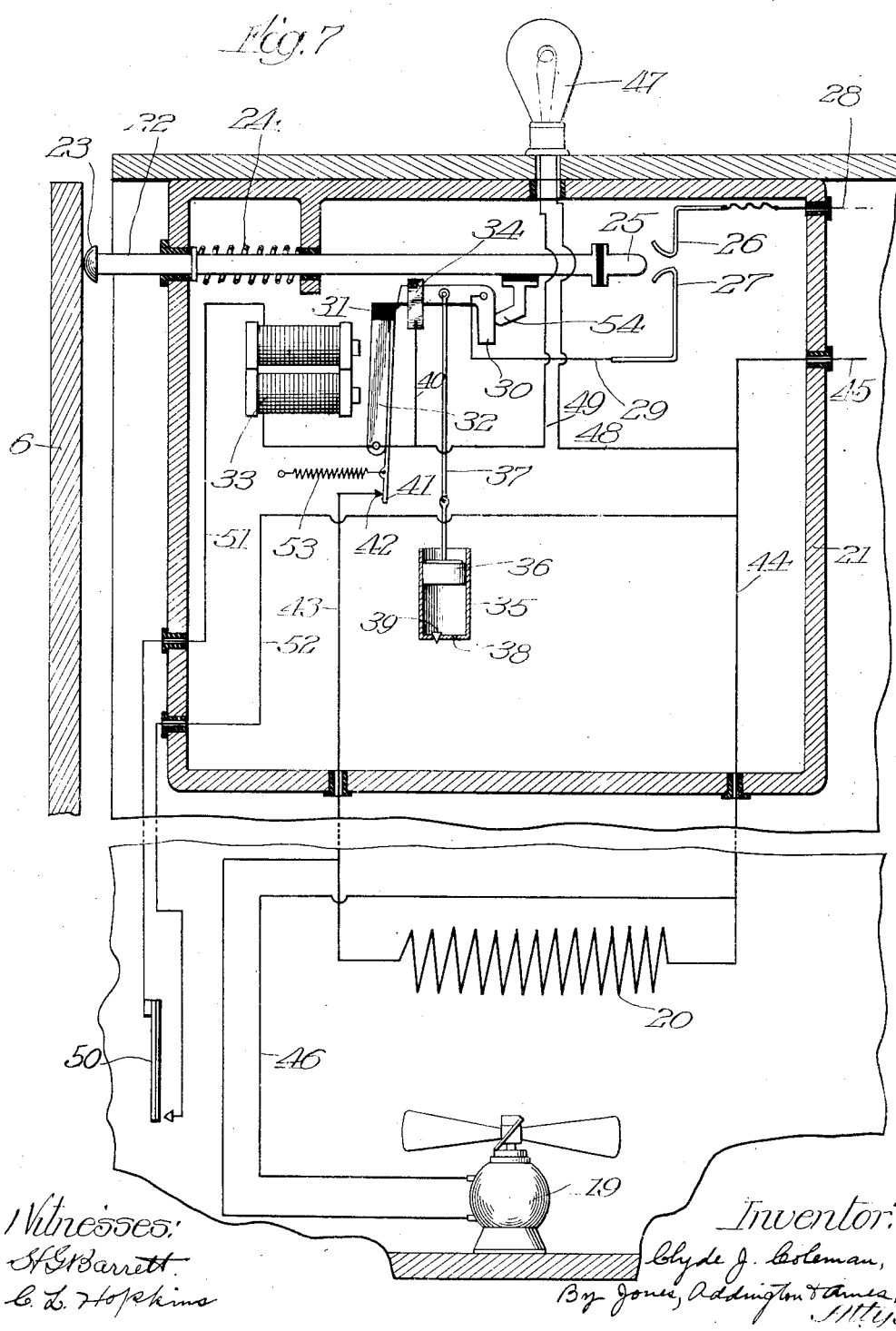

CLYDE J. COLEMAN, OF NEW YORK, N. Y.

WARDROBE.

1,087,278.  Specification of Letters Patent.  Patented Feb. 17, 1914.

Application filed May 3, 1909. Serial No. 493,674.

*To all whom it may concern:*

Be it known that I, CLYDE J. COLEMAN, a citizen of the United States, residing at New York, in the county of New York and State of New York, have invented new and useful Improvements in Wardrobes, of which the following is a full, clear, concise, and exact description, reference being had to the accompanying drawing, forming a part of this specification.

This invention relates to improvements in wardrobes, the object being to provide means for the safe storage of furs, clothing or other articles which are subject to destruction by moths or other vermin when left exposed accessible to the same.

Heretofore it has been common to place within the storage space in which furs and fabrics are to be kept, some chemical or other substance which is destructive of moths, or which repels them by its odor. This method is open to the objection that such substances are usually effective only to a limited degree, and involve, in their use, the packing of the articles in such manner that they require repressing before use, and usually require airing to rid them of objectionable odors. Another common expedient is to place the articles in cedar chests, tar coated bags and the like, which are intended to be moth-proof. This method has also its practical difficulties, as well as being troublesome to carry out.

Recently it has come to be common practice to send furs and valuable articles made of fabrics to cold storage warehouses, in which they are brought to, and kept continuously at, a temperature so low as to prevent the hatching of moths' eggs.

I have discovered that if moths or other vermin are subjected to a temperature sufficiently above or below the normal, and for a sufficiently long time, they will be killed, even though such temperature be far from sufficiently abnormal to be injurious to the articles which it is desired to protect from the ravages of the vermin. I have discovered also that the eggs of moths and other destructive vermin will be destroyed and rendered incapable of hatching by being subjected to this abnormal temperature for a certain length of time. After the vermin and eggs have been destroyed any further maintenance of the abnormal temperature is useless, provided that the entrance of other vermin is not permitted.

In the accompanying drawings I have shown a movable wardrobe embodying my invention in one of its forms. In this wardrobe there is provided means whereby, upon the closing of the door thereof, suitable heating apparatus is automatically started, the operation of which apparatus is made to cease after the temperature of the space within the wardrobe has been raised to a predetermined point and maintained at such point for a predetermined length of time. Upon the opening of the door to take the articles from or put articles into the cabinet, the outside air is, of course, admitted to the interior of the latter, but upon again closing the door any vermin that may have entered the wardrobe, or any eggs that may have been deposited therein during the interval in which the door was open, are killed or rendered incapable of hatching by the raising of the temperature upon the door being again closed.

I find it convenient to employ an electric heating coil as the temperature raising means, as this may be started and stopped by the employment of suitable switching apparatus which I have devised and which is operated by the closing of the door.

In the accompanying drawings—Figure 1 illustrates in elevation, a front view of the wardrobe; Fig. 2 shows a side view of the same with a portion of one of the side walls broken away to expose to view the interior of the cabinet; Fig. 3 is a vertical longitudinal section on line 3—3 of Fig. 2, looking toward the back of the wardrobe; Fig. 4 is a cross sectional view looking downward; Figs. 5 and 6 show details of the construction of the door-locking means; and Fig. 7 shows diagrammatically the electrical apparatus and circuit connections.

In these several figures, 1, 1 indicate the side walls of the wardrobe and 2 indicates the rear wall. These walls, as well as the top 3 and bottom 4, are lined with a layer 5 of asbestos or other suitable heat insulating material, the asbestos being preferably covered and concealed by another lining 5ª of sheet zinc or other metal. The door 6 is similarly provided with a layer of asbestos and a lining of zinc, and is made to shut perfectly tight by means of a strip 7 of cork or the like extending around the doorway and set into a strip 8 of wood. In order that the door may seat itself evenly against the strip 7 it is supported upon crane hinges, each of which comprises a bar 9, hinged to the wardrobe, and a bar 10 extending across the door and hinged to the bar 9 at a point midway across the door. A pressure bar 11 extends vertically in front of the middle of the door and is provided at its ends with locking means which coöperate with suitable complementary means on the wardrobe when the bar 11 is revolved by throwing the handle 12 carried by the bar around to the opposite position to that shown in the figures of the drawings. The locking means on the ends of the bar 11 consist of heads 13 having pins 14 projecting therefrom and arranged to run into curved grooves 15 on the brackets 16 when the bar 11 is revolved to the locking position. The center of curvature of the grooves 15 is farther in than the center of revolution of the rod, so that the rod, and the door to which it is secured, are moved inwardly with sufficient force to make the door engage firmly and evenly the cork strip 7 at all points when the bar is revolved as stated.

Means may be provided for causing a circulation of the air within the wardrobe while the heating apparatus is in operation. To this end two vertical inner walls 16 and 17 extend nearly to the top and within a short distance of the bottom of the wardrobe. At the bottom these walls are carried inward toward the center of the cabinet and are slightly inclined downward, so that a passage is formed upon each side of the wardrobe which extends vertically along the side and extends in toward the center at the bottom of the wardrobe. The central chamber is provided with a circular opening 18 in its bottom, and slats or rods 18$^a$ extend across this chamber a short distance above the bottom. Within the circular opening is located an electric fan 19. When the fan is in operation, the air within the wardrobe is caused to flow downwardly at each side of the wardrobe between the partitions 16 and 17 and the outer walls, and upward through the inner chamber.

The heating device 20 is preferably placed over the opening 18, and for this purpose any approved form of electric heater may be used. The heater and fan may be fed from an electric lighting circuit or the like, and are controlled by apparatus located in a box 21 placed at some convenient point as, for instance, in the upper left hand corner of the wardrobe, as shown in the drawings. Within this box 21 is arranged mechanism whereby when the door is first closed, suitable switching means are operated to connect the heater (as well as the fan when such fan is provided) in circuit with the source of current supply, other means being provided to turn the current off when the temperature has risen to the proper point and been maintained at this point for the proper length of time.

By reference to Fig. 7, in which the circuit arrangements are shown and the devices within the box 21 are diagrammatically illustrated, it will be seen that a push rod 22 extends from the front of the box and is provided upon its outer end with a knob 23 adapted to be engaged by the door 6 when the same is closed. In Fig. 7 the door is shown as partly open and the push rod 22 is shown as thrust out to the limit of its movement by a spring 24 which is coiled around the same. The inner end 25 of the push rod is insulated from the body of the rod and, when the rod is thrust in, is arranged to pass between and electrically connect a pair of contacts 26 and 27, one of which, 26, is connected by means of a lead 28 with the source of current supply. From the other contact 27 leads a wire 29 to an L-shaped lever 30, one end of which may rest upon an insulating block 31 carried by the armature 32 of an electromagnet 33. This end of the lever 30 serves as one of the members of a circuit closer, the other member of which is a metallic strip 34 upon which the lever 30 slides when moved about its fulcrum. A dash pot 35 is provided for retarding and governing the fall of the lever when the armature 32 is attracted by the electromagnet 33, and is so constructed that the period of operation of the dashpot may be definitely determined, thus providing time-operated means for controlling the operation of the heater hereinafter described. This dash pot has a weighted piston 36 which is connected by means of a rod 37 with the arm of the lever 30. The slow descent of the piston in the dash pot is permitted by a small opening 38 through which air may escape. This opening may evidently be made adjustable in area if so desired. A valve 39 is also provided which opens to permit the free passage of air into the dash pot while the piston is being raised, and closes upon the descent of the same. From contact strip 34 leads a wire 40 to the pivot of the armature 32. The armature carries a contact member 41 which engages, when the armature is released from the influence of the magnet, a contact 42 from which leads a wire 43 to one terminal of the heater 20 and one terminal of the motor of the fan 19. From the opposite end of the heater extends a wire 44 which is connected by means of a lead 45, with the source of current supply. A wire 46 leading from the other side of the motor of the fan is connected to the wire 44. This heater 20 should be of sufficient capacity to raise the temperature of the interior of the wardrobe to a temperature of substantially 160° F., which should be preferably maintained for a period of about ten minutes. As before stated, the dash-pot can be adjusted to keep the heater in operation for a period of several hours, if necessary. I have found by actual experiment that a temperature of 160° F., is sufficient to destroy moths and their eggs without, however, injuring the clothes or other articles that may be stored in the wardrobe.

It will be seen that upon the thrusting in of the rod 22 by the closing of the door, after the same has been opened to permit clothing or other articles to be placed in the wardrobe, the bridging of the space between the contacts 26 and 27 by the contact 25 on the push rod, closes the circuit through the heating device and through the fan, which is connected in parallel with the heater. The temperature within the wardrobe will now begin to rise, the fact that current is flowing through the heater being indicated by the lighting up of an electric lamp 47 which is connected across wire 44 and strip 34 by means of wires 48 and 49 so as to be supplied with current as long as current flows in any part of the apparatus. This lamp may be located in a hood 47ª upon the top of the wardrobe, as seen in Figs. 1 and 2. To control the action of the heater and maintain the temperature constant at the proper point so long as the heater is in operation a thermostat 50 is arranged in a shunt circuit which includes the electromagnet 33, by means of wires 51 and 52. When the temperature within the wardrobe reaches the predetermined point the thermostat closes the shunt circuit and the electromagnet is energized, attracting its armature and withdrawing the insulating block 31 carried thereby from under the long arm of the lever 30, permitting the arm to pass off the block 31 and begin its descent under the influence of the weighted piston 36 of the dash pot. At the same time the contact member 41 carried by the armature is moved away from contact 42 and the circuits through the heater and fan are broken. The heater being now inoperative, the temperature will begin to fall and the thermostat will soon reopen its circuit, permitting the armature to be retracted by its spring 53 and again closing the heater circuit. This opening and closing of the heater circuit may take place several times during the descent of the dash pot piston and the long arm of the lever. Whenever the circuit is closed through the heater, current will flow therethrough, so long as the arm of the lever 30 has not passed out of engagement with the strip 34. At length the cylinder of the dash pot descends to its limit and the circuit is broken between the strip 34 and the lever 30. Current is now wholly cut off from the wardrobe and the lamp 47 is extinguished to indicate this fact. Upon the opening of the wardrobe door the lever is again moved outward by the spring 24, whereupon a projection 54, which extends downwardly from the bar 22 and is insulated therefrom, engages the short arm of the lever 30 and restores the lever to the position shown in Fig. 7. The apparatus is now reset, so that the circuit may be again established by the inward movement of the push rod when the door is closed.

It will be observed that the abnormal temperature condition is not maintained continuously, as is the case where goods are stored in a cold-storage warehouse, but is maintained only for a sufficient time to destroy the vermin, and enough longer to allow a safe margin so as to insure the impossibility of any eggs hatching thereafter that were subjected to the abnormal condition. By the provision of means for exterminating the moths and their eggs immediately after the door of the wardrobe is closed, and by excluding other moths so long as the door remains closed, the necessity of maintaining an abnormal condition for any considerable length of time is rendered unnecessary.

Having thus described my invention, what I claim as new and desire to secure by Letters Patents, is:

1. The combination of a wardrobe for the storage of furs and fabrics, means for heating the atmosphere within said wardrobe to a vermin-destroying temperature, means for automatically discontinuing the operation of said heating means at the expiration of a predetermined period after a predetermined maximum temperature has been attained, and means for maintaining the wardrobe proof against the entry of vermin from the outside thereof.

2. The combination of a wardrobe, means for changing the temperature of the space within said wardrobe, means for automatically setting said first-named means in operation upon the closing of said wardrobe, and means for automatically discontinuing the action of said first-named means after a predetermined temperature has been attained within the wardrobe.

3. The combination of a vermin-excluding wardrobe, means for changing the temperature within said wardrobe from the normal, means operating upon the closing of said wardrobe for starting said temperature-changing means, means for automatically governing the temperature change, and means for discontinuing the action of said temperature-changing means when the temperature has been maintained at a predetermined point for a predetermined period.

4. The combination of a vermin-excluding wardrobe, means for changing the temperature within said wardrobe from the normal and adapted to maintain the same at a given point, means for automatically starting said temperature-changing means upon the closing of the wardrobe, and means for automatically discontinuing the action of said temperature-changing means when the temperature has been maintained at a predetermined point for a predetermined period.

5. The combination of a storage wardrobe, means for raising the temperature of the space therein to a predetermined point, and means for automatically discontinuing the action of said temperature-raising means upon the expiration of a predetermined period after a predetermined temperature has been attained within the wardrobe.

6. The combination of a storage wardrobe, heating means therein, means for automatically controlling said heating means to prevent the temperature of the wardrobe rising above a given point, and means for automatically discontinuing the action of said heating means at the expiration of a predetermined period after a predetermined temperature has been attained within the wardrobe.

7. The combination with a vermin-excluding wardrobe, of an electric heater therein, switch mechanism operated by the closing of the wardrobe for setting said heater in operation, means for automatically stopping the action of said heater at the end of a given period after a predetermined temperature has been attained within the wardrobe, and means for automatically controlling the temperature within the wardrobe while the heater is in operation.

8. The combination of a vermin-excluding wardrobe, an electric heater for raising the temperature of the space within said wardrobe, means for automatically establishing connection between said heater and a source of current supply upon the closing of said wardrobe, a thermostat for governing the action of said heater, and means for automatically disconnecting said heater from said source of current supply after the temperature has been maintained at a vermin-killing point for a sufficient time.

9. The combination with a wardrobe, of an electric heating apparatus for raising the temperature of the space therein, means adapted to automatically connect said heater in circuit with a source of current by the closing of said wardrobe, thermostatic means for controlling said heater, means for automatically disconnecting said heater from said source of current supply when the temperature has been maintained at a given point for a given period, and means exterior to said cabinet for indicating the starting and stopping of said heater.

10. The combination with a wardrobe, of means adapted to create within the interior thereof conditions capable of exterminating vermin, means operated by the closing of the wardrobe for starting said first-named means, and means for automatically stopping said first-named means upon the expiration of a given period after a predetermined temperature has been attained within the wardrobe.

11. The combination with a wardrobe, of means for creating within the same a condition capable of killing vermin and their eggs, means for automatically setting said condition-creating means in operation upon the closing of the wardrobe, means for automatically stopping the operation of said condition-creating means after the expiration of a predetermined period after a predetermined temperature has been attained within the wardrobe, and means for automatically governing the action of said condition-creating means.

12. The combination with a wardrobe, of vermin-extermining means within said wardrobe, means automatically operating upon the closing of said wardrobe for starting the operation of said exterminating means, and means for stopping said exterminating means at the expiration of a predetermined period after a predetermined temperature has been attained within the wardrobe.

13. The combination with a vermin-proof wardrobe, of vermin-exterminating means within said wardrobe, means automatically operating upon the closing of said wardrobe for starting said exterminating means, means for stopping said exterminating means at the expiration of a predetermined period after a predetermined temperature has been attained within the wardrobe, and means external of said wardrobe for indicating starting and stopping of said exterminating means.

14. The combination with a wardrobe having a door, of means operated by the closing of the door for changing the temperature within said wardrobe, and means for automatically discontinuing said temperature-varying means upon the attainment of a predetermined temperature within said wardrobe.

In witness whereof, I have hereunto subscribed my name in the presence of two witnesses.

CLYDE J. COLEMAN.

Witnesses:
M. L. FARRAR,
C. L. HOPKINS.